(12) United States Patent
Dowe et al.

(10) Patent No.: US 7,187,858 B2
(45) Date of Patent: Mar. 6, 2007

(54) CAMERA AND METHOD FOR OPERATING A CAMERA BASED UPON AVAILABLE POWER IN A SUPPLY

(75) Inventors: David R. Dowe, Holley, NY (US); Daniel J. Scoville, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 296 days.

(21) Appl. No.: 10/984,146

(22) Filed: Nov. 9, 2004

(65) Prior Publication Data

US 2005/0063119 A1 Mar. 24, 2005

Related U.S. Application Data

(63) Continuation-in-part of application No. 10/331,429, filed on Dec. 30, 2002, now abandoned.

(51) Int. Cl.
G03B 7/26 (2006.01)
G03B 17/48 (2006.01)
G03B 19/00 (2006.01)
G03B 29/00 (2006.01)
H04N 7/18 (2006.01)

(52) U.S. Cl. .................. 396/277; 396/303; 396/429; 348/64; 358/909.1

(58) Field of Classification Search ............. 396/277, 396/279, 281, 301, 302, 303, 129, 280, 429, 396/48; 348/64, 231.99, 272; 358/906, 358/909.1
See application file for complete search history.

(56) References Cited

U.S. PATENT DOCUMENTS

| | | | |
|---|---|---|---|
| 4,126,874 A | 11/1978 | Suzuki et al. ............... | 396/301 |
| 4,458,996 A | 7/1984 | Harigaya et al. ............. | 396/48 |
| 4,502,774 A | 3/1985 | Suzuki et al. ............... | 396/129 |
| 4,611,898 A | 9/1986 | Matsuyama ................. | 396/301 |
| 5,023,470 A | 6/1991 | Onozuka et al. ............ | 307/108 |
| 5,027,150 A | 6/1991 | Inoue et al. ................. | 396/48 |
| 5,500,710 A | 3/1996 | Saito et al. ................. | 396/277 |
| 5,527,630 A * | 6/1996 | Nagata et al. ................ | 429/7 |
| 6,031,999 A * | 2/2000 | Ogawa ....................... | 396/303 |
| 6,134,391 A | 10/2000 | Takahashi ................... | 396/277 |
| 6,289,180 B1 | 9/2001 | Jeng ........................... | 396/206 |
| 2004/0126105 A1 | 7/2004 | Dowe et al. ................ | 396/277 |

FOREIGN PATENT DOCUMENTS

| JP | 59-149334 | 8/1984 |
|---|---|---|
| JP | 2000-305142 | 11/2000 |

* cited by examiner

*Primary Examiner*—W. B. Perkey
*Assistant Examiner*—Rochelle Blackman
(74) *Attorney, Agent, or Firm*—Roland R. Schindler, II

(57) ABSTRACT

In one aspect of the invention, a camera for use with a power supply is provided. The camera has a voltage detecting circuit adapted to detect a voltage level at the power source and to generate a voltage level signal. An image capture system is also provided and performs a set of image capture operations. A controller receives the voltage level signal and prevents the image capture system from capturing an image when the voltage level signal indicates that there is insufficient power available in the power supply to perform all of operation in the set of image capture operations.

16 Claims, 8 Drawing Sheets

CAMERA AND METHOD FOR OPERATING A CAMERA BASED UPON AVAILABLE POWER IN A SUPPLY

CROSS-REFERERENCE TO RELATED APPLICATION

This application is a continuation-in-part of commonly assigned, application Ser. No. 10/331,429 filed Dec. 30, 2002 now abandoned in the names of David R. Dowe et al. and entitled CAMERA AND METHOD FOR OPERATING A CAMERA BASED UPON AVAILABLE POWER IN A SUPPLY.

FIELD OF THE INVENTION

The present invention relates to cameras with electronically controlled elements and more particularly to camera systems having finite power supplies.

BACKGROUND OF THE INVENTION

Film cameras have been developed with electromechanical systems that support automatic functions such as film winding, film rewinding, exposure control, electronic flash, etc., all controlled by a controller such as a microprocessor. Electrical energy is provided to such electromechanical systems and the controller by a power supply. Most often, the power supply is a chemical battery of conventional design that stores a fixed amount of potential energy and releases this potential energy in the form of electricity. As this electricity is used, the amount of power remaining in the power supply is reduced. After extended operation, the potential energy stored in the power supply can be reduced to a level that is insufficient to allow the camera to reliably perform certain camera operations.

The amount of potential energy stored in the power supply can be determined based upon the difference of potential or voltage between electrically positive and negative terminals of the power supply. As potential energy in the power supply is reduced, the difference in potential at the terminals lowers. Accordingly, cameras are known that monitor voltage levels between the terminals of the power supply and provide a warning when voltage levels at the terminals reach a predetermined low level.

However, it can also be useful to prevent the camera from attempting to perform functions that cannot be reliably performed when the camera is in operation. The cameras of the prior art employ various general strategies to prevent camera mis-operation caused by low levels of available energy in a battery.

One strategy is to modify the operation of certain camera elements in order to ensure that the operation of the camera components does not consume so much power as to interfere with the operation the camera. For example, U.S. Pat. No. 5,023,470, filed by Onozuka et al. on Apr.18, 1989 shows an electronic flash charging circuit for use with a camera having a power source common to a microcomputer that controls a plurality of camera functions and to an electronic flash. The charging circuit has a booster circuit for boosting a charging voltage with which a main capacitor of the electronic flash is charged and a controller that causes the booster circuit to operate intermittently. This intermittently charges the main capacitor so that charging the capacitor does not lower the battery voltage below the level necessary to support operation of the microcomputer.

Another strategy involves using the voltage level at the battery to determine whether the operation of the camera microprocessor will be altered by the performance of particular camera functions. U.S. Pat. No. 5,027,150, entitled "Camera" filed on Jun. 25,1991, by Inoue et al. describes a camera system that detects a battery voltage that is below a threshold and suspends camera operation in response thereto. The camera described in the '150 patent also stores data that is in the microprocessor in a backup memory so that such data is not lost when the camera batteries are changed. In still another example of this type, U.S. Pat. No. 4,126,874 entitled "Power Supply Circuit for A Camera", filed by Suzuki et al. on Dec. 20, 1976 describes a power supply circuit that uses a delayed testing scheme to test battery voltage levels. In this patent, camera operation is disabled where the voltage levels detected after the delay are below a threshold. This delayed testing is used where the battery response to the testing is such that the battery responds more accurately to testing after the battery has been used for a period of time.

Yet another strategy involves testing the battery under load to determine whether the battery has sufficient energy to support a maximum load that may occur during camera operation. Where the monitoring indicates that the load is below the maximum, functions associated with the maximum load are disabled. For example, Suzuki et al. U.S. Pat. No. 4,502,744 describes a battery check procedure that applies an actual load on the camera battery that simulates the maximum load that can be placed on the battery by one of the camera components. The voltage at the power supply is monitored during this maximum load. If this voltage is below a threshold, photography is inhibited.

A further strategy involves determining whether particular functions can be performed and disabling those functions when the camera battery does not have enough energy to perform those functions. For example, U.S. Pat. No. 5,500,710 entitled "Source Voltage Monitor for A Photographic Camera", filed by Saito et al. on Dec. 15, 1994 describes a system that applies a load to a battery and tests the battery voltage levels under load prior to release of the shutter to determine whether there is sufficient power in the camera to effect shutter release. Shutter release is prohibited where the voltage levels indicate that there is insufficient power in the camera battery to properly release the shutter. Similarly, U.S. Pat. No. 4,611,989 entitled "Voltage Detecting Device" filed by Matsuyama on Feb. 13, 1985 describes a voltage detector that measures voltage during movement of a leader screen on a camera shutter so that an accurate determination can be made as to whether there is sufficient energy in a power supply to effect a normal release of a follower screen. In these patents, shutter release is prohibited where the voltage levels indicate that there is insufficient power in the camera battery.

The systems described above show various means for insuring the particular camera operations do not create a risk of unusual operation by testing the battery to determine whether there is sufficient power to perform one or another of the camera operations. In most automatic cameras, the photographic process involves many operations each of which consumes power. Thus, while there may be sufficient power in the power supply to provide reliable performance of one camera operation, there may not be sufficient power in the power supply to provide reliable performance of that camera operation after other precursor operations have been performed as the camera operations are executed to capture an image. Thus, testing a camera power supply to detect whether there is sufficient energy in the camera power supply to perform a particular camera function does not always provide an accurate indication as to whether there is sufficient energy to perform the entire set of camera operations.

The alternative strategy of testing voltage levels at a power supply during the photographic process and selectively disabling certain camera functions as is described in certain of the above-cited patents, can be problematic. This is because many photographers can be confused when a camera ceases operation during a portion of a photographic process and can draw the wrong conclusion that the camera mechanical systems have failed when the source of the problem is exhaustion of the power supply.

Thus, what is needed is a camera and method for controlling a camera having a new control strategy that addresses these considerations.

SUMMARY OF THE INVENTION

In one aspect of the invention, a camera for use with a power supply is provided. The camera has a voltage detecting circuit adapted to detect a voltage level at the power source and to generate a voltage level signal. An image capture system is also provided and performs a set of image capture operations. A controller receives the voltage level signal and prevents the image capture system from capturing an image when the voltage level signal indicates that there is insufficient power available in the power supply to perform all of the operations in the set of image capture operations.

In another aspect of the invention, a camera for use with a power supply is provided. The camera has a trigger circuit adapted to generate a trigger signal and a voltage detecting circuit adapted to detect a voltage level at the power supply and to generate a voltage level signal. An image capture system is also provided and executes a set of image capture operations to capture images in response to a capture signal from a controller. The controller receives the trigger signal and the voltage level signal and generates a capture signal when the trigger signal is received and the voltage level signal indicates that there is sufficient power available in the power supply to perform the image capture operations.

In still another aspect of the invention, a camera for use with a power supply is provided. The camera has a trigger circuit generating an activation signal and a voltage detecting circuit adapted to measure the voltage in the power supply and to generate a trigger signal when the voltage in the power supply indicates that the power supply has at least a minimum amount of power. An image capture system is adapted to capture an image in response to the trigger signal. Wherein, the minimum amount of power required is sufficient to complete a set of image capture operations used by the image capture system to capture an image.

In a further aspect of the invention, a method for operating an image capture system of the type having a power supply is provided. In accordance with the method, a trigger signal is detected and a voltage level at the power supply is measured. A set of image capture operations is executed only when a trigger signal is detected and the measured voltage level indicates that the power supply has sufficient power to permit completion of the set of image capture operations.

DETAILED DESCRIPTION OF THE INVENTION

Figure 1:
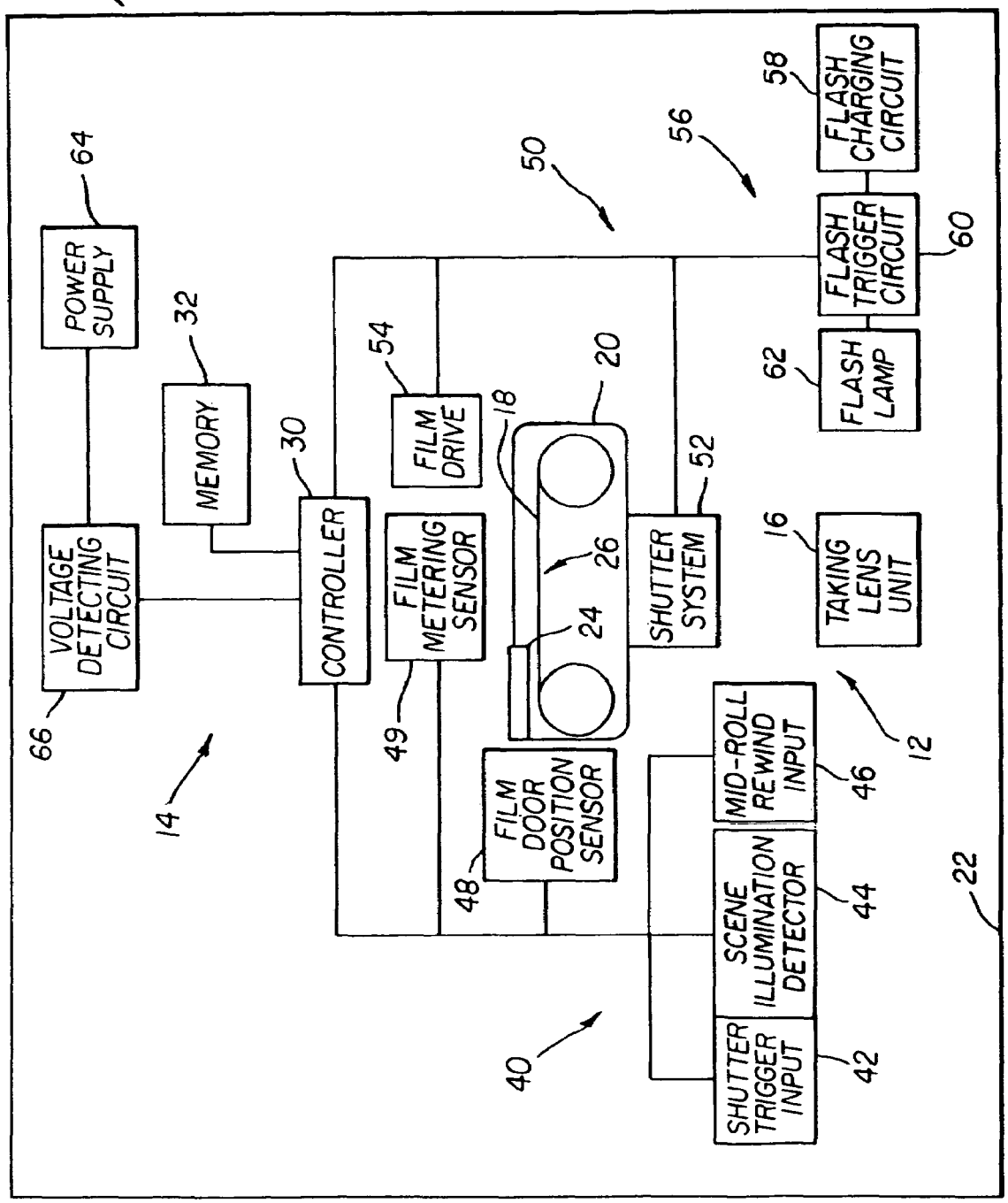
FIG. 1 is a schematic diagram of one embodiment of a camera of the present invention having a control system.

FIG. 1 shows a schematic illustration of one embodiment of a camera 10 in accordance with the present invention. As is shown in FIG. 1, camera 10 has an image capture system 12 and a control system 14. Image capture system 12 comprises a taking lens unit 16 for focusing light from a scene onto a film 18 stored in a film chamber 20 in camera body 22. Camera body 22 has a film door 24 that can be opened to permit film to be moved in and out of camera body 22 and closed to secure film 18 in camera body 22. As will be described in greater detail below, image capture system 12 also comprises a shutter system 52 for controllably exposing film 18 to light from the scene.

Control system 14 has a controller 30 which can be any of a programmable general-purpose microprocessor, a special-purpose camera control microprocessor, or other programmable processor. In one embodiment, controller 30 has a memory 32 containing a program with instructions to be executed by controller 30 during operation. Memory 32 can be integral to controller 30 or can be separate as is shown in the embodiment FIG. 1. Controller 30 receives electronic signals from input systems 40, extracts information from the signals, and uses this information in executing the programmed instructions.

In the embodiment shown in FIG. 1, input systems 40 comprise a shutter trigger input 42, a scene illumination level detector 44, a mid-roll rewind input 46, a film door position detector 48, and a film metering sensor 49. Shutter trigger input 42 is a controllable transducer that generates a signal when a user indicates a desire to capture an image. Shutter trigger input 42 can comprise, for example, a switch that the user of camera 10 can selectively open or close to indicate when the user wants to capture an image. Scene illumination level detector 44 monitors light levels in the photographic scene confronting camera 10 and generates a signal indicative of the light levels in the scene. One example of such a scene illumination level detector 44 is a conventional photocell. Scene illumination level detector 44 can also comprise other conventional light level detection devices and systems.

Mid-roll rewind input 46 is a controllable transducer such as a switch that generates a rewind signal when a user indicates a desire to manually initiate film rewind operations. Mid-roll rewind input 46 can comprise, for example a switch that the user of camera 10 can selectively close or open to indicate when the user wants to manually initiate film rewind operations. A film door position detector 48 generates a signal that indicates when film door 24 is open and when film door 24 is closed. Film door position detector 48 can comprise a transducer such as an electromechanical switch or electro-optical switch or electromagnetic switch.

Film metering sensor 49 monitors movement of film 18 within a film metering area 26 in film chamber 20. In one embodiment, where film 18 has perforations, film metering sensor 49 can comprise an electromechanical switch which engages the perforations. The electromechanical switch opens and closes as perforations on film 18 are moved through film metering area 26. In another embodiment, film metering sensor 49 comprises an opto-electric switch that photo-electrically senses movement of film 18 by optically detecting perforations on film 18. Other film movement detecting devices can also be used to detect movement of film 18 and to generate a signal from which it can be determined that there has been movement of film 18 within the film metering area 26.

Controller 30 generates signals that operate controlled systems 50. In the embodiment shown in FIG. 1, controlled systems 50 include shutter system 52, a motorized film drive system 54, and a flash system 56. Shutter system 52 comprises an optical barrier located between taking lens unit 16 and film 18. In a rest state, shutter system 52 blocks light from striking film 18. During an exposure, actuators in shutter system 52 move shutter system 52 so that a controlled amount of light from a scene strikes film 18. Motorized film drive system 54 winds film 18 between frames to provide appropriate separation of images between images recorded on film 18 and is also adapted to rewind film 18.

Flash system 56 has a flash charging circuit 58, a flash trigger circuit 60 and a flash lamp 62. Flash charging circuit 58 builds potential in an energy storage device such as a flash capacitor (not shown). Flash trigger circuit 60 receives a flash signal from controller 30 and, in response thereto, causes energy stored in the flash charging circuit 58 to flow to flash lamp 62 to achieve a discharge of flash illumination.

In operation, controller 30 receives input signals from input systems 40 processes the input signals in accordance with the camera control programming stored in memory 32 to generate output signals that cause the controlled systems 50 to perform various functions.

A power supply 64 supplies energy that is used to operate the systems of camera 10. Power supply 64 typically comprises a chemical battery of conventional design that stores a fixed amount of potential energy and releases this potential energy in the form of electricity. The amount of potential energy in power supply 64 is fixed. As image capture system 12, control system 14, input systems 40 and controlled systems 50 operate, the amount of potential energy stored in the power supply 64 decreases. After extended operation, energy stored in power supply 64 can become insufficient to maintain reliable operation of control systems 14, input systems 40 and/or controlled systems 50. The amount of potential energy stored in power supply 64 can be determined based upon the difference of potential between positive and negative terminals (not shown) of power supply 64. As potential energy is removed from power supply 64 to operate the control system 14, the difference in potential is reduced.

A voltage detecting circuit 66 is provided which monitors the voltage level at power supply 64 and generates an output signal based upon the voltage level. Voltage detecting circuit 66 can take many forms. In one embodiment, a TC54 series integrated circuit sold by Microchip Technology Inc., Chandler, Ariz., USA or equivalent is used. Other known voltage detecting circuits can also be used. In the embodiment shown, voltage detecting circuit 66 detects whether the voltage at power supply 64 is above a threshold voltage, for example, a threshold of 2.4 volts. When voltage detecting circuit 66 detects that the voltage across the terminals of power supply 64 is above the 2.4 volt threshold, voltage detecting circuit 66 will produce a first output signal. When voltage detecting circuit 66 detects that the voltage across the terminals of power supply 64 is below 2.4 volts, voltage detecting circuit 66 will produce a second output signal. One sample of such a first output signal is a signal having a difference of potential of 2.4 volts while one example of a second signal is a signal having a ground potential. Voltage detecting circuit 66 can work in other ways. For example, voltage detecting circuit 66 can generate an output signal that is proportional to the voltage level at the terminals.

The signal from voltage detecting circuit 66 is supplied to controller 30 which determines information useful in executing the instructions in the program. In this embodiment, controller 30 monitors the output signal from voltage detecting circuit 66. Where controller 30 detects the first signal from voltage detecting circuit 66, controller 30 is programmed to allow a shutter system 52 to operate. Conversely, where controller 30 detects the second signal from voltage detecting circuit 66, controller 30 is programmed to prevent shutter system 52 from operating. As will be described in greater detail below, the threshold voltage level is determined based upon the requirements of the system to perform a set of more than one image capture operations during an image capture operation.

Figure 2:
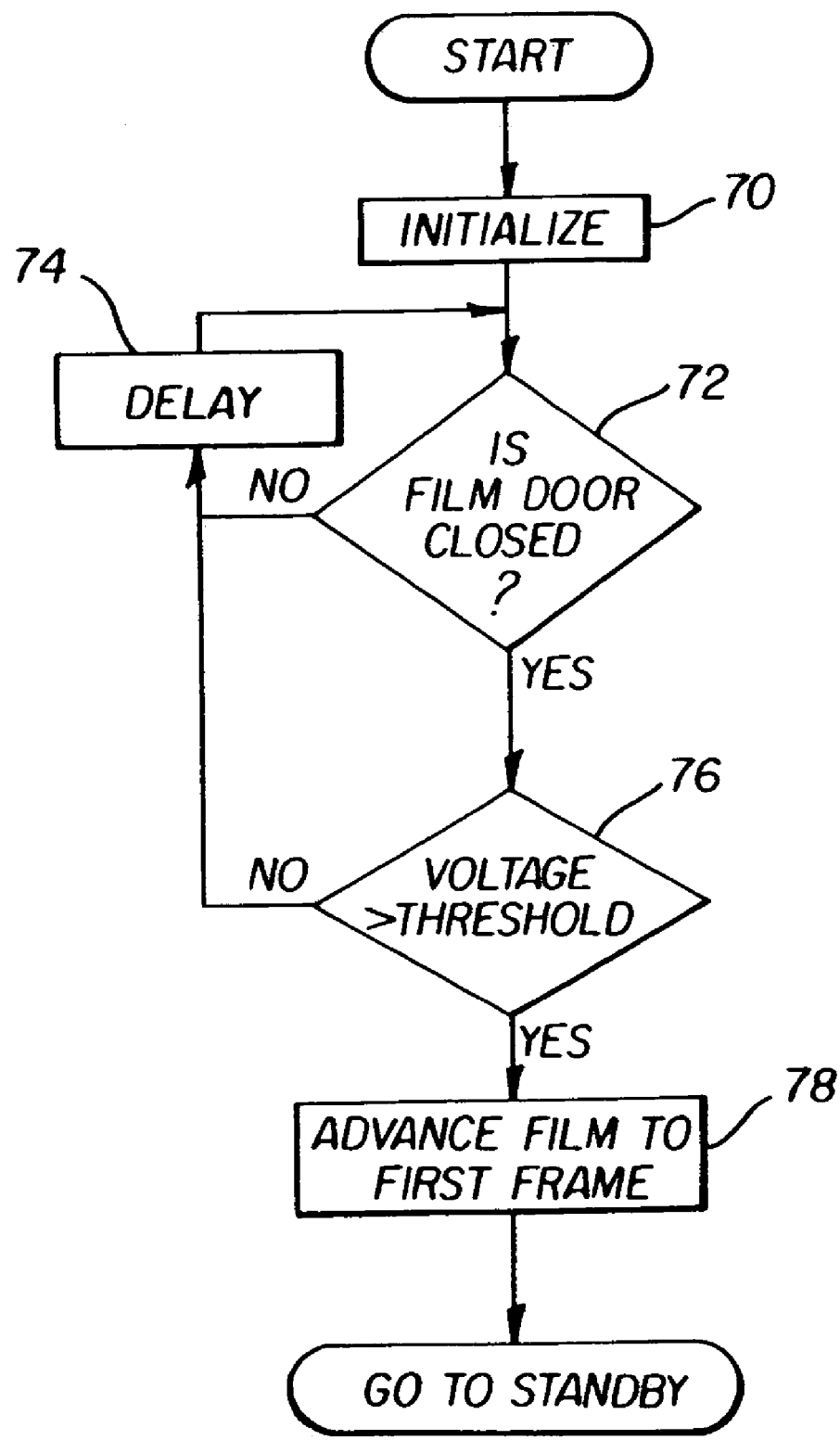
FIG. 2 is a flow diagram depicting the steps of a camera initialization operation that can be used in accordance with the method of the present invention.

FIGS. 2–5 are flow diagrams depicting one embodiment of a method for controlling a camera in accordance with the present invention. FIG. 2 shows a film initialization operation. Control system 14 performs the steps of the film initialization operation when control system 14 is activated (step 70). This activation can occur for example when a camera on/off switch (not shown) is moved to an "on" position from an "off" position. Typically, an on/off switch determines whether power stored in power supply 64 is available to be used by controller 30, input systems 40, or controlled systems 50. Where the on/off switch is in the "off" position, no power is supplied. Where the on/off switch is in the "on" position power is supplied and initialization begins. Other known activation systems can also be used.

Once activated, controller 30 samples the signal generated by film door position detector 48 to determine if film door 24 is closed (step 72). If film door 24 is open, controller 30 waits for a delay period to expire (step 74). After the delay period has expired, controller 30 again monitors film door position detector 48. When controller 30 determines that film door 24 is closed, controller 30 samples the signal generated by voltage detecting circuit 66 to determine whether the voltage level at power supply 64 matches a predetermined threshold voltage (step 76).

In the present invention, the threshold voltage is determined to be the voltage level that indicates that there is sufficient power in power supply 64 to perform a set of operations used by camera 10 to capture an image. As defined herein the set of image capture operations includes at least a take picture operation shown in FIG. 4 and a film wind operation shown in FIG. 5. These and other operations that can optionally be included in the set of image capture operations considered when determining a threshold voltage will be described in greater detail below. By way of introduction, the operations can also include a standby operation shown in FIG. 3, and a film rewind operation shown in FIG. 6. Energy is consumed in performing each of these steps. Accordingly, the threshold voltage used to determine whether there is sufficient power in power supply 64 to completely perform at least a minimum combination of the steps of the set of image capture operations.

Table 1 illustrates how this threshold voltage can be determined. Table 1 shows the voltage thresholds for the operation of various components of camera 10.

TABLE 1

Voltage Level Requirements:

| Control system element | Minimum voltage at power supply for operation of element. |
|---|---|
| Motorized film drive system (54) | 2.3 volts |
| Shutter system (52) | 2.2 volts |
| Controller (30) | 2.0 volts |
| Scene Illumination Detector (44) | 2.0 volts |
| Flash System (56) | 1.6 volts |
| Mid-Roll Rewind Input (46) | 1.2 volts |
| Film Door Position detector (48) | 1.2 volts |

As can be seen from this, a voltage level at power supply 64 that is below 2.3 volts indicates that there is insufficient power stored in power supply 64 to permit motorized film drive system 54 to complete the operation associated with advancing photographic film from one position to another. Similarly, a voltage at the terminals of power supply 64 of 2.2 volts indicates that there is insufficient power stored in power supply 64 to permit shutter system 52 to complete an exposure operation. However, under both of these conditions, there is still sufficient power to operate controller 30, scene illumination detector 44, flash system 56, mid-roll rewind input 46, and other components of camera 10 not shown in Table 1.

There are many steps in the set of image capture operations, each step is performed to complete the process. Each of these operations consume power when more than one step is to be performed. To capture an image, it is necessary to ensure that there will be sufficient power remaining in power supply 64 after the performance of the operations in the set of image capture operations to permit any subsequent steps to be performed. In accordance with the present invention, the set of image capture operations are not performed unless it is first determined that there is sufficient energy available in power supply 64 to execute each step in the set of image capture operations. For example, it will be noted that the operation of shutter system 52 requires the second largest amount of energy that is required by any component of camera 10 and that the operation of motorized film drive system 54 which occurs after an operation of shutter system 52. Thus, if controller 30 were programmed to use a threshold voltage of 2.3 volts and the power remaining in power supply 64 was such that power supply 64 could maintain 2.3 volts at the start of the set of image capture operations, it could occur that the operation of shutter system 52 consumes so much of the energy remaining in power supply 64 that when the set of image capture operations reached the step of activating the motorized film drive system 54, the voltage at power supply 64 is below 2.3 volts, a level that is insufficient to operate the motorized film drive system 54.

Thus, in the present invention the threshold voltage is set at a level that indicates that power supply 64 has enough stored energy to allow all of the steps of the set of image capture operations to be performed. If the voltage at power supply 64 is below this threshold, controller 30 executes a delay (step 74) without executing any part of a set of image capture operations. This camera inactivity provides an intuitive indication to the user of camera 10 that the power supply 64 does not have sufficient energy to execute the set of image capture operations.

If it is determined that the voltage at power supply 64 is above the threshold voltage, controller 30 sends a signal to motorized film drive system 54 causing motorized film drive system 54 to advance film 18 to the first usable picture area which is known as the first frame. Thus, camera 10 is now ready to perform the standby operations shown in FIG. 3. If it is determined that the voltage of power supply 64 is below the threshold voltage, then a delay is executed (step 74) and voltage levels are retested. Camera 10 cannot capture images when this occurs in this way. Camera 10 does not perform a partial image capture operation leading a user to possibly to possibly conclude that there has been a camera malfunction caused by a problem that requires a repair.

Figure 3:
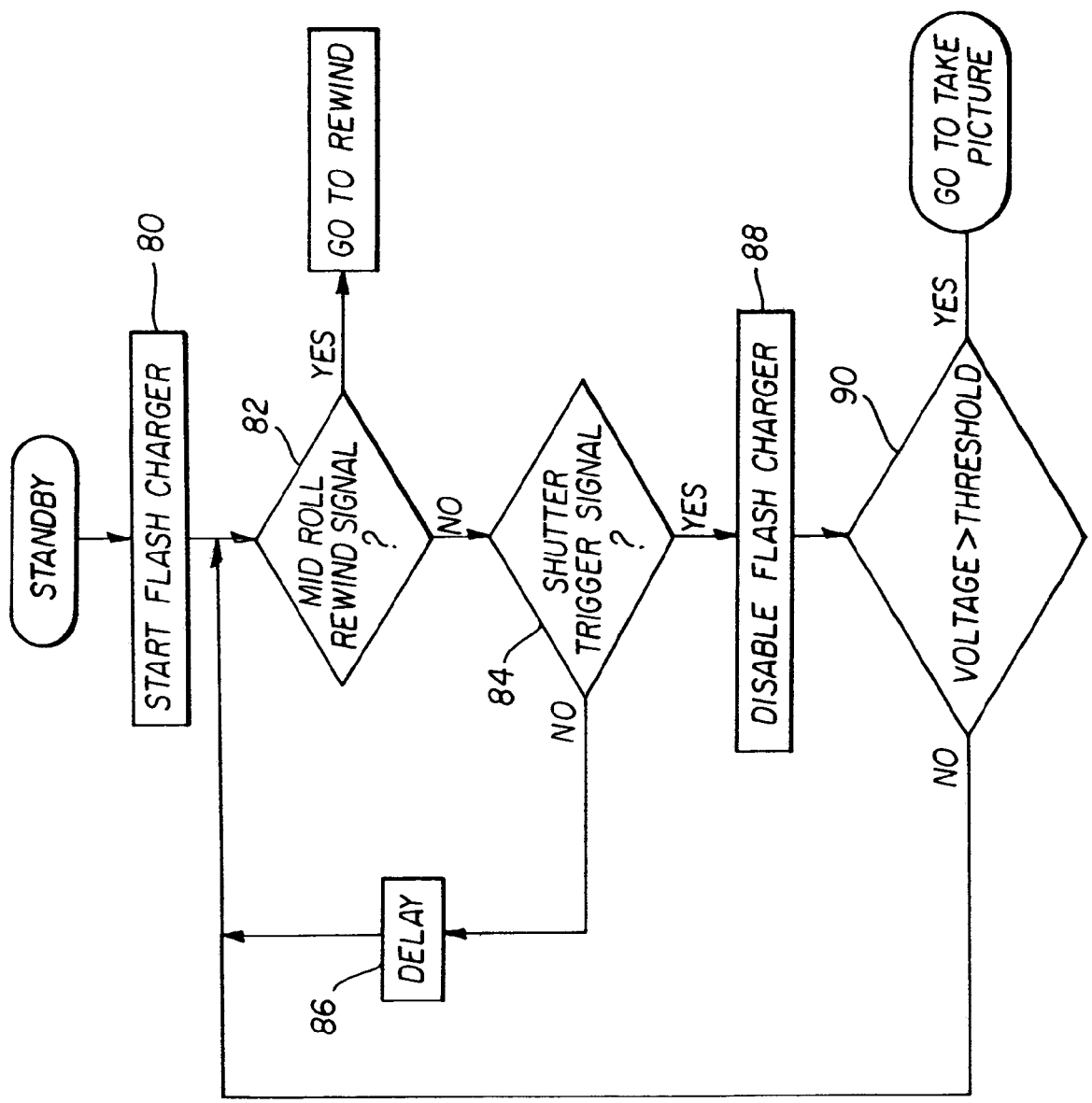
FIG. 3 is a flow diagram depicting the steps of a standby operation.
Figure 4:
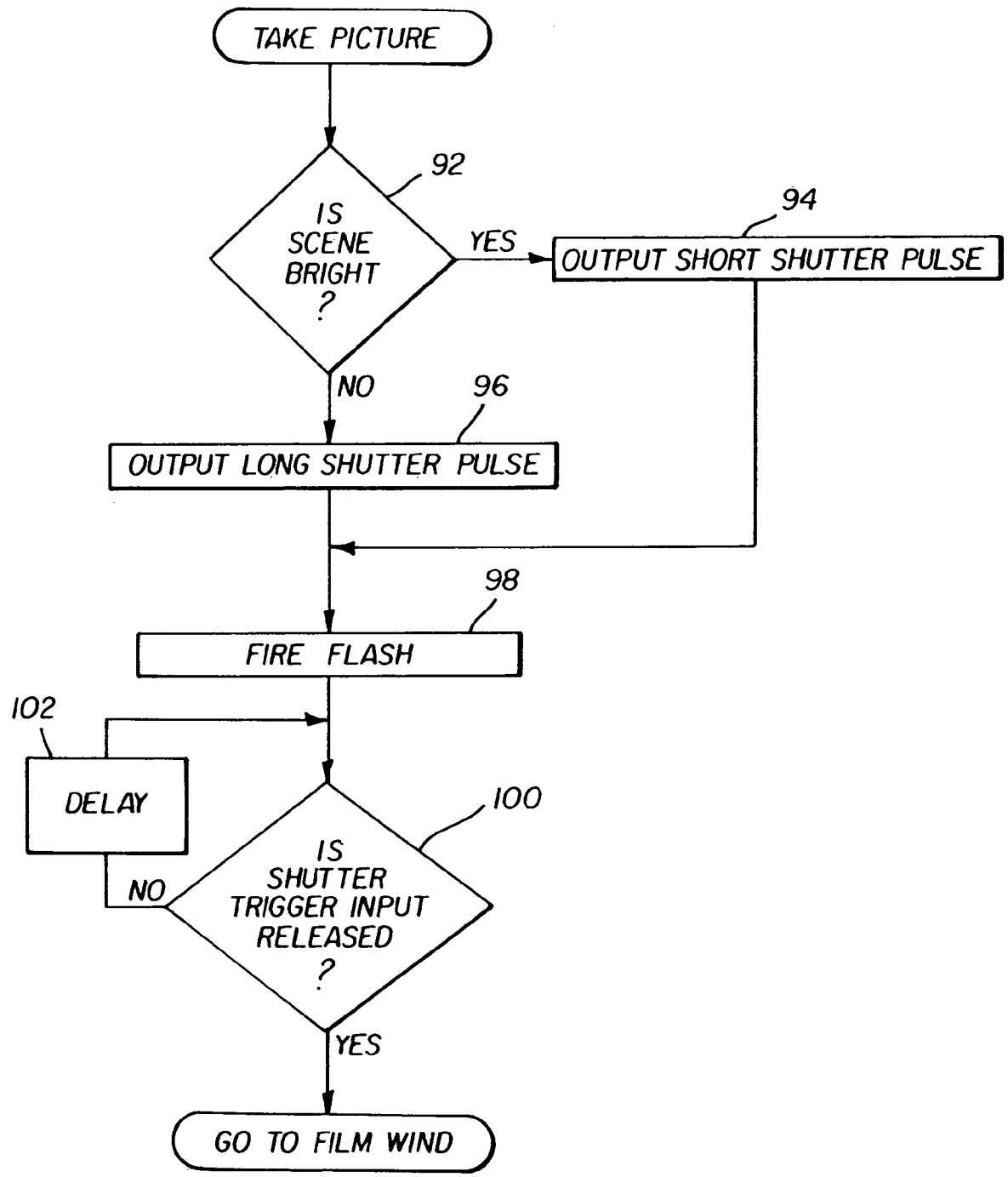
FIG. 4 is a flow diagram depicting the steps of a take picture operation.

As is shown in FIG. 3, during the standby operations, controller 30 sends a signal to flash system 56 causing flash charging circuit 58 to store energy for use in flash photography (step 80). In cameras having a mid-roll rewind input 46, a check is performed to determine if mid-roll rewind input 46 is generating a signal indicating that film 16 should be rewound. If the mid-roll rewind signal is detected by controller 30, controller 30 performs the rewind operations described in FIG. 6 (step 82). If the mid-roll rewind switch is not detected, controller 30 determines whether a shutter trigger signal has been generated indicating that a user wants to capture an image (step 84).

Where the shutter trigger signal is not received, controller 30 executes a delay for period of time (step 86) after which controller 30 again determines whether a shutter trigger signal has been generated. When the user of camera 10 causes the shutter trigger input 42 to transmit the shutter trigger signal, controller 30 causes flash charging circuit 58 to stop the charging of the flash (step 88). This reduces the amount of power drawn from the power supply 64 during the subsequent steps.

The voltage level at power supply 64 is again monitored to determine if the voltage is above the threshold (step 90). If the voltage at power supply 64 is not above the threshold voltage, controller 30 does not proceed to the take picture operations. In this way, the power available for image capture operations is checked immediately before controller 30 attempts to execute the instructions for performing the image capture operations. If the voltage at power supply 64 is above the threshold, controller 30 proceeds to the take picture operations shown in FIG. 4.

When controller 30 determines that the take picture operations are to be performed, controller 30 examines signals provided by scene illumination detector 44 to controller 30 to determine a scene illumination level (step 92). Where the scene illumination is determined to be bright, controller 30 transmits a signal that causes shutter system 52 to expose film 18 to light from the scene for a predetermined period of time that is appropriate for recording useful images of bright scenes on film 18 (step 94). Where controller 30 determines that the scene illumination is not bright, controller 30 transmits a signal causing shutter system 52 to expose film 18 for a period of time that is sufficient for capturing useful images of scenes that are not bright (step 96). Typically, shutter system 52 exposes film 18 for a period of time that is relatively longer than the period of time that is used for capturing images of scenes that are bright.

In the embodiment shown, controller 30 also transmits a signal to flash trigger circuit 60 which releases flash energy stored in flash charging circuit 58 to flow through flash lamp 62 causing a flash of light (step 98). In this embodiment of camera 10, controller 30 is programmed to cause a flash of light to be triggered with each image. However, this is not necessarily so. In an alternative embodiment, controller 30 can evaluate the scene brightness and can selectively elect to whether to cause flash trigger circuit 60 to permit a flash discharge based upon this evaluation.

After the flash is fired, controller 30 samples the signal generated by shutter trigger input 42 and determines if the camera user has released shutter trigger input 42 from an image capture position. If shutter trigger input 42 has not been released controller 30 executes a delay (step 102) and again determines whether shutter trigger input 42 has been released (step 100). When shutter trigger input 42 is released, controller 30 executes the film wind operations described in FIG. 45.

Figure 5:
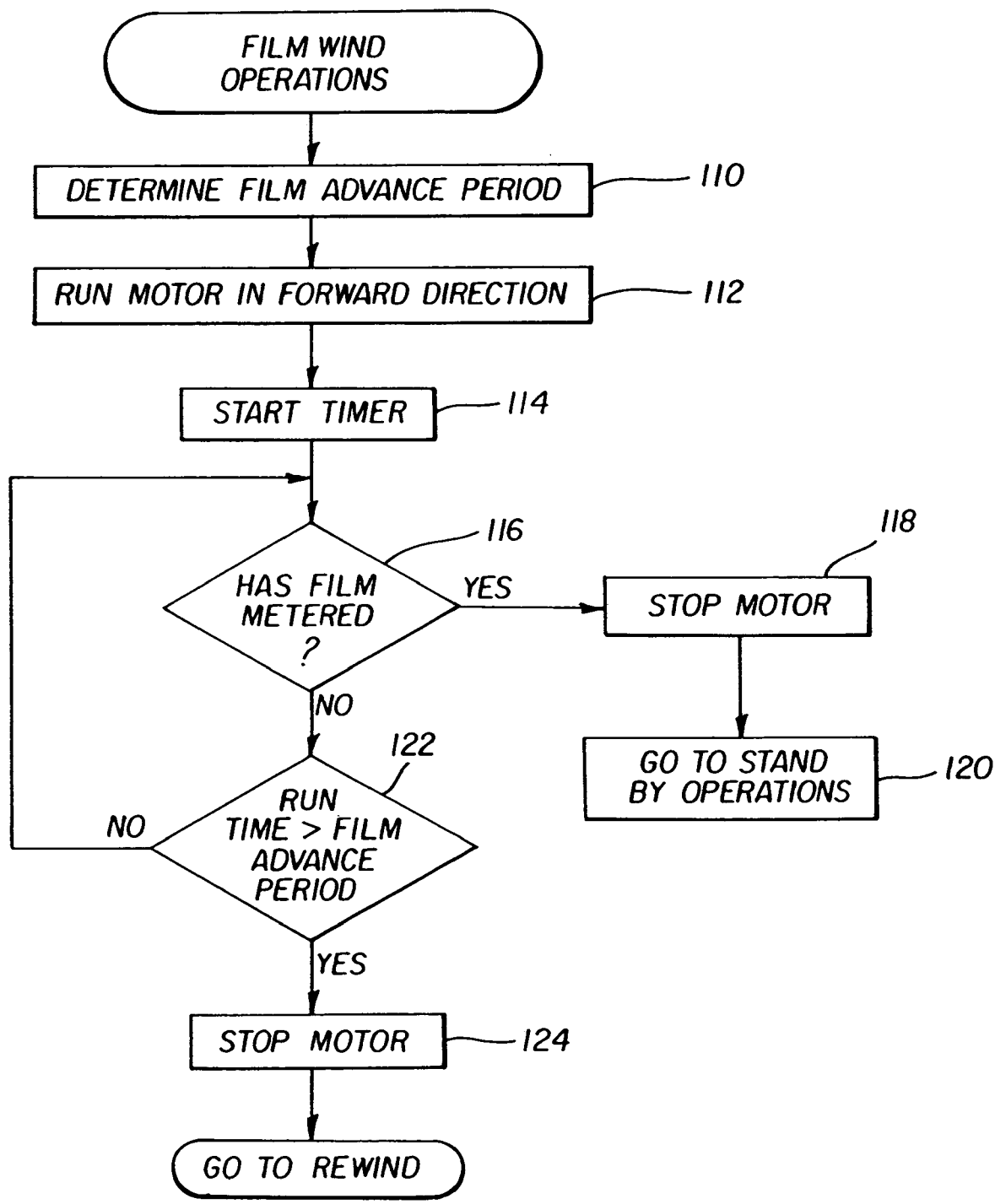
FIG. 5 is a flow diagram depicting the steps of a wind operation.

Referring to FIG. 5, controller 30 determines a film advance period (step 110). This can be determined by accessing information in memory 32. Controller 30 then causes motorized film drive 54 to advance film 18 in a forward direction (step 112). Controller 30 monitors signals from film metering sensor 49 to detect movement of film 18 and uses the detected film movement to determine when film 18 is properly advanced or metered (step 114). Controller 30 continues running motorized film drive system 54 until the film advance period ends (step 118) or until it is determined that film 18 has been moved one full image frame (step 114). When film 18 has advanced one full frame, film 18 is positioned to capture another image and controller 30 stops motorized film drive 54 (step 116). Controller 30 goes to the standby operations FIG. 3.

If controller 30 determines that motorized film drive system 54 has been operating for the entire film advance period without detecting movement of film 18, then controller 30 assumes that film 18 is jammed or that the end of the film roll has been reached. Controller 30 stops motorized film drive system 54 from advancing film 18 (step 120) and proceeds to the rewind operations shown in FIG. 6.

Figure 6:
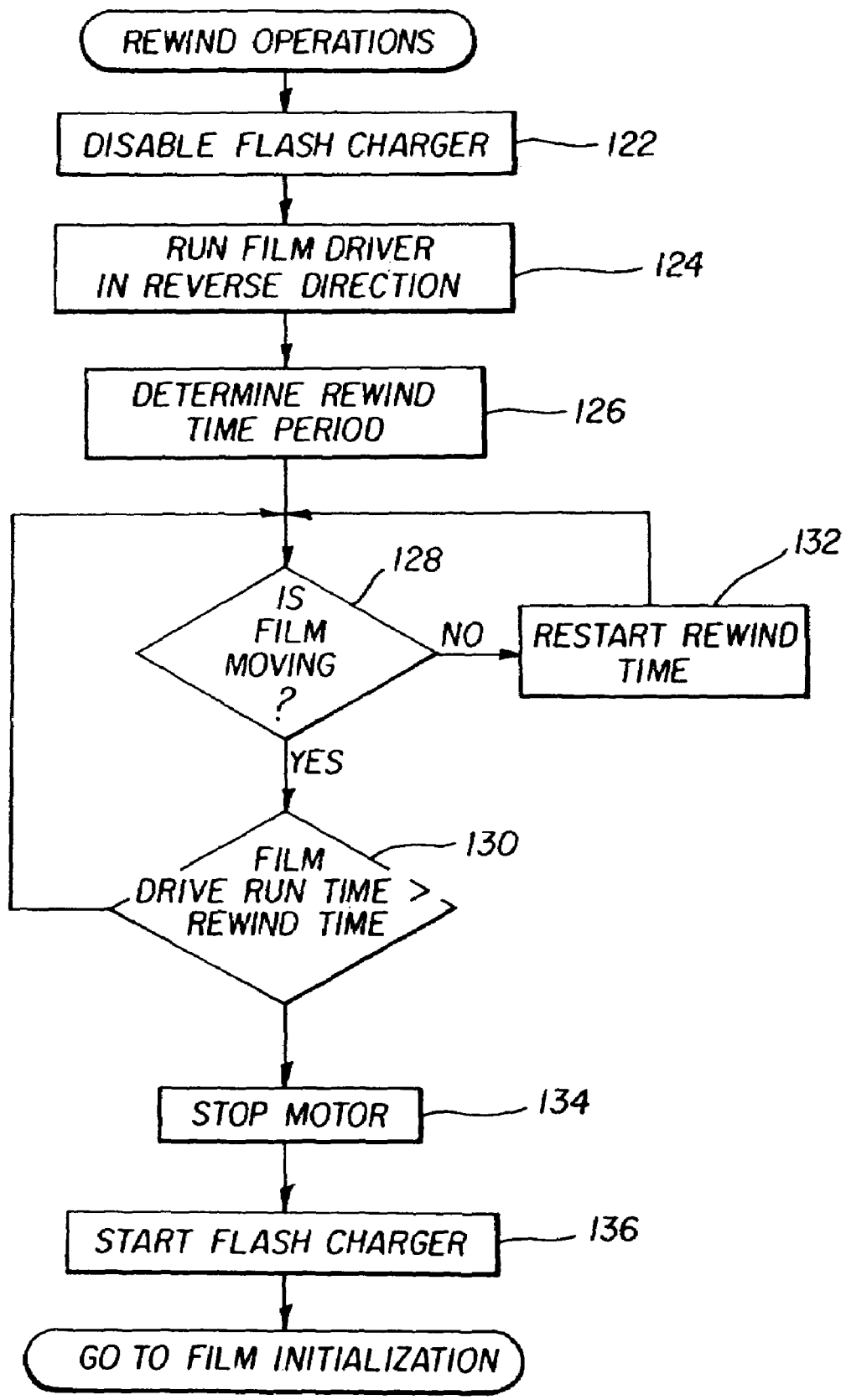
FIG. 6 is a flow diagram depicting the steps of a rewind operation.

Referring to FIG. 6, controller 30 in the rewind operation disables flash charging (step 122), starts motorized film drive system 54 in the reverse direction (step 124), and determines a film rewind time (step 126). Controller 30 monitors the signal generated by film metering sensor 49 during this time and determines if film 18 moves in response to operation of motorized film drive system 54 (step 128). If film metering sensor 49 detects film movement when motorized film drive system 54 is operated, then controller 30 knows that film 18 is moving in film metering area 26. It will be appreciated that during this time film 18 is in one of two states. In one state film 18 is fully rewound on, for example, a film spool inside a housing (not shown) and in the other state, the film is not rewound into the housing. Controller 30 can detect if film 18 is not wound into the film housing by monitoring film metering sensor 49 to detect film movement. When film movement occurs, controller 30 runs motorized film drive system 54 in the reverse direction for an additional time period (step 132) and loops back to determine if movement (step 128) and, to check if film 18 has started moving again (step 128). If no film movement is determined, the program continues to monitor the film drive run time (step 130). If the run time is greater than or equal to the rewind time, film 18 is considered rewound and, controller 30 stops motorized film drive system 54 (step 134), starts the charging of the flash (step 136), and proceeds to the film initialization operation.

As the preceding descriptions of FIGS. 2–6 show, the power remaining in power supply 64 is checked before a picture sequence is initiated and before film advancement during initialization is started. This insures that power supply 64 has enough power to complete both of these two activities when performed together. Power supply 64 is not checked before initiating a film winding operation because film wind occurs immediately after the picture taking operation where the battery status was just checked and because the threshold voltage used in determining whether there is sufficient power in power supply 64 before the set of image capture operations was established with consideration that there should be sufficient energy in power supply 64 to complete the take picture operation and the film wind operation. In an alternate embodiment, the threshold voltage is determined based upon the amount of power required to execute the take picture, film wind and film rewind operations. In still another alternate embodiment, the threshold voltage is determined based upon the amount of power required to execute the standby, take picture, and film wind operations. Other combination of such operations can be used.

Figure 7:
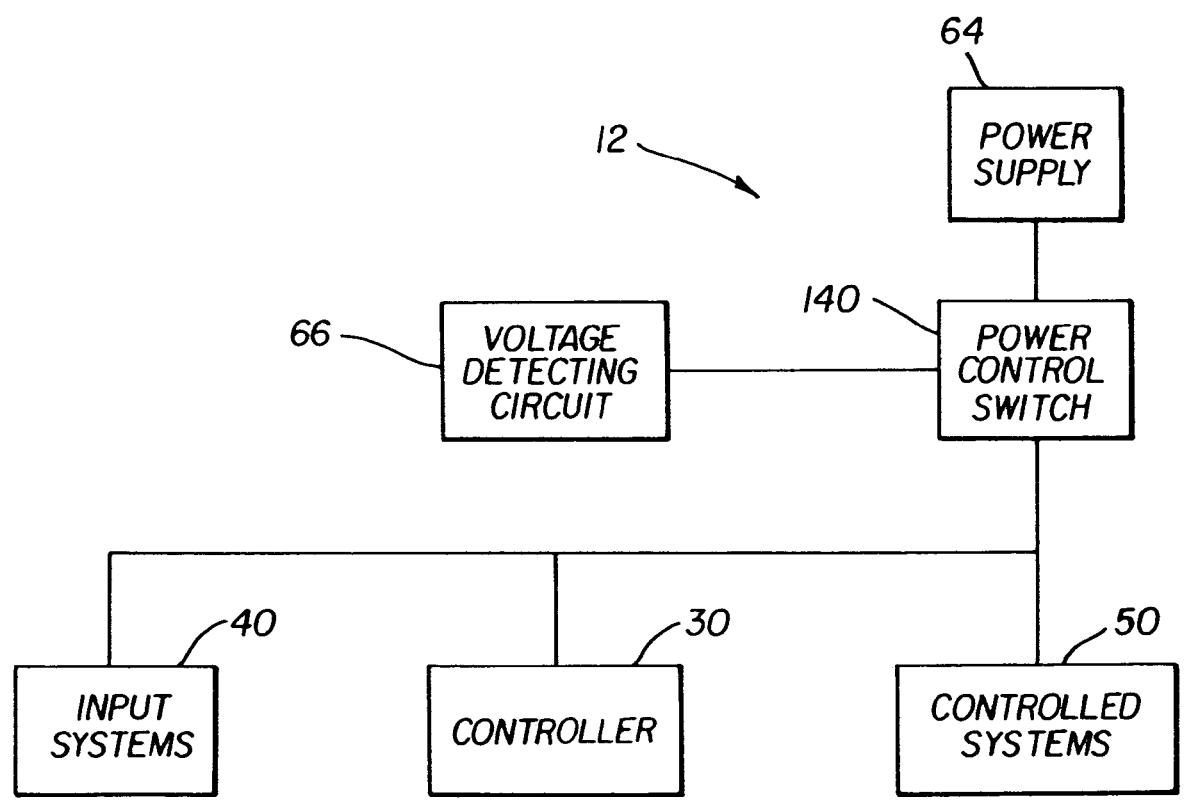
FIG. 7 is a schematic diagram of another embodiment of a camera control system useful in the camera of the present invention.

In another embodiment of the present invention shown in FIG. 7, voltage detecting circuit 66 controls a power control switch 140 such as a relay, transistor, or other like switching device. Power control switch 140 is connected in series between power supply 64, controller 30, input systems 40 and/or controlled systems 50. In circumstances where voltage detecting circuit 66 determines that the voltage that power supply 64 does not meet the threshold voltage, voltage detecting circuit 66 transmits a signal to power control switch 140 which prevents power from being supplied to controller 30, input systems 40 and controlled systems 50. This disables camera 10 where it is determined that there is insufficient power remaining in power supply 64 to fully executes the set of image capture operations. Alternatively, this arrangement can also be used to selectively disable controlled systems 50 so that controller 30 and input systems 40 can continue to operate. For example camera 10 can optionally incorporate a warning or alarm that can be used to indicate that there is insufficient power in power supply 64 to permit operation of camera 10. It will also be appreciated that in this embodiment, the voltage detecting circuit 66 and power control switch 140 combine to control whether camera 10 operates.

Figure 8:
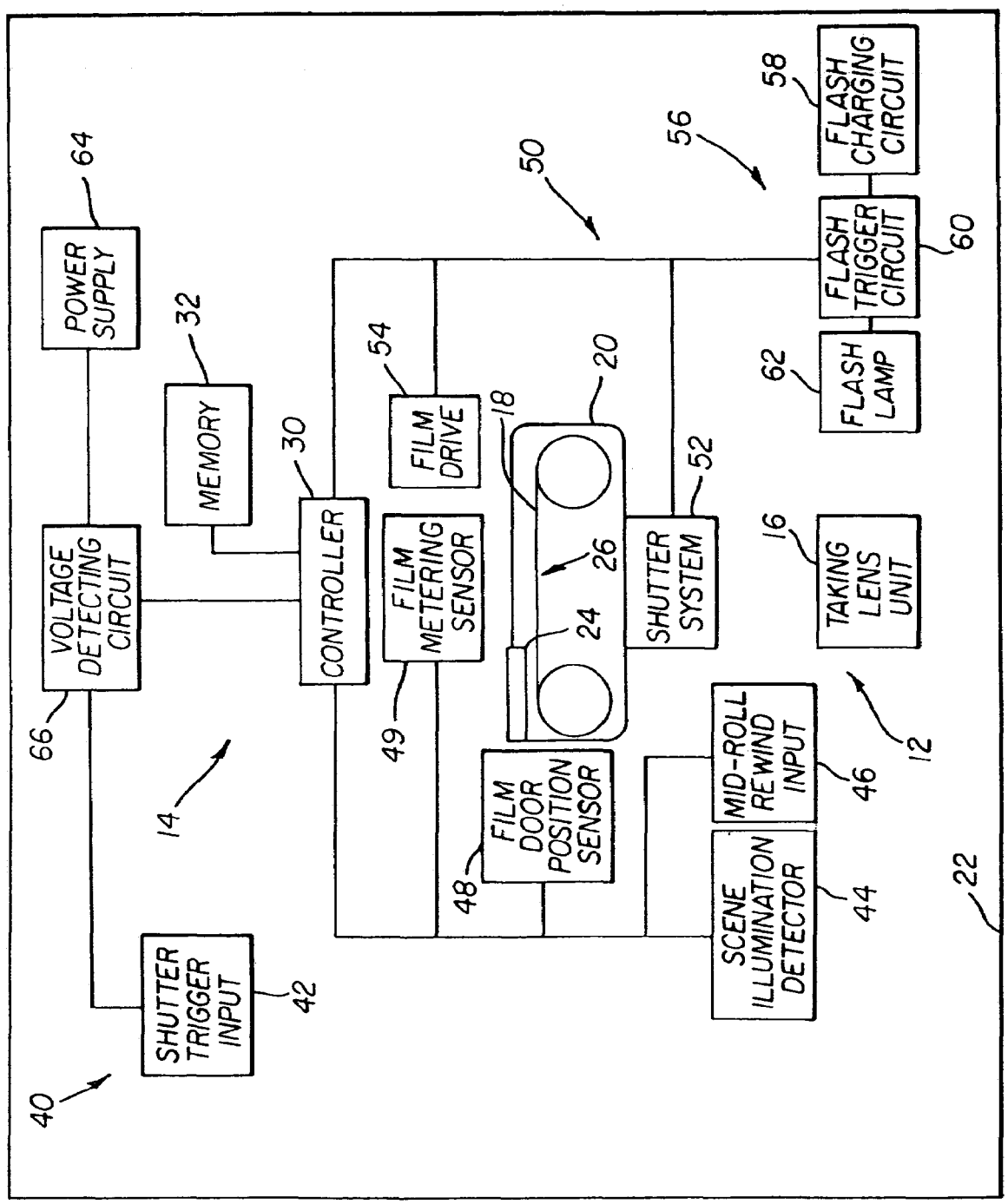
FIG. 8 is a schematic diagram of another embodiment of a camera of the present invention.

FIG. 8 shows still another embodiment of the present invention. In this embodiment, shutter trigger input 42 acts as an input that activates voltage detecting circuit 66. When voltage detecting circuit 66 detects a voltage level at power supply 64 indicating that there is sufficient power in power supply 64 to execute all of the set of image capture operations, voltage detecting circuit 66 transmits a signal to controller 30 which then executes the set of image capture operations. However, where shutter trigger input 42 does not activate voltage detecting circuit 66 or where an activated voltage detecting circuit 66 does not detect sufficient voltage in power supply 64 to permit completion of the set of image capture operations, no signal is sent to controller 30, and therefore no image capture operations are attempted.

Image capture system 12 has been described herein in the context of a film camera. However, image capture system 12 can also comprise a hybrid film/electronic image capture system or an electronic image capture system such as any conventional digital image capture system that uses a solid state imager to capture images of a scene in a digital or analog electronic form as are known in the art. One example of such an image capture system is described in commonly assigned and co-pending U.S. patent application Ser. No. 10/028,644, entitled "Method and Camera System for Blurring Portions of a Verification Image to Show Out of Focus Areas in a Captured Archival Image", filed on Dec. 21, 2001, by Belz, et al. incorporated herein by reference. Where image capture system 12 comprises such an electronic image capture system, image capture system 12 will operate in the same fashion with the threshold voltage being established at a level sufficient to complete the set of image capture operations.

The invention has been described in detail with particular reference to certain preferred embodiments thereof, but it will be understood that variations and modifications can be effected within the spirit and scope of the invention. For example, in FIG. 1, shutter trigger input 42 is described as a single switch that the user activates to provide a shutter trigger signal to controller 30. Controller 30 then determines whether there is sufficient power available in power supply 54 for the entire set of image capture operations, including operation of shutter system 52, to be performed. Alternatively, as is in prior art U.S. Pat. No. 6,134,391 issued Oct. 17, 2000 in the name of Takahashi, the shutter trigger input can be two switches that when successively activated provide first and second trigger signals to begin a battery residual-power check and to operate the shutter, assuming there remains sufficient power in the battery. Thus, shutter trigger input 42 in FIG. 1 can have two switches that when successively activated provide first and second trigger signals to controller 30. Controller 30 would determine whether there is sufficient power available in power supply 54 for the entire set of image capture operations to be performed, when receiving the first trigger signal. If controller 30 determines there is sufficient power available in power supply 54 for the entire set of image capture operations to be performed, when receiving the first trigger signal, then upon receiving the second trigger signal shutter system 52 would be operated. Conversely, if controller 30 determines there is not sufficient power available in power supply 54 for the entire set of image capture operations to be performed, when receiving the first trigger signal, then upon receiving the second trigger signal shutter system 52 would not be operated. Of course, a visible insufficient-power warning, such as a flashing LED, could be energized to alert the user.

PARTS LIST 10 camera
12 image capture system
14 control system
16 taking lens unit
18 film
20 film chamber
22 camera body
24 film door
26 film metering area
30 controller
32 memory
40 input systems
42 shutter trigger input
44 scene illumination detector
46 mid-roll rewind input
48 film door position detector
49 film metering sensor
50 controlled systems
52 shutter system
54 motorized film drive system
56 flash system
58 flash charging circuit
60 flash trigger circuit
62 flash lamp
64 power supply
66 voltage detecting circuit
70 initialize step
72 film door closed determination step
74 delay step
76 voltage level threshold determining step
78 advance film step
80 start flash charger step
82 mid-roll rewind signal detecting step
84 trigger signal detecting step
86 delay step
88 stop flash charger step
90 voltage level threshold determining step
92 determine scene illumination level step
94 output short exposure pulse step
96 output long exposure pulse step
98 fire flash step
100 detect trigger signal step
102 delay step
110 film advance time determining step
112 runs film drive and forward direction step
114 determine rewind time step
116 determine film metering step
118 stop film drive step
122 determine film drive run time greater than film advance time
124 stop film drive step
126 disable flash charger step
128 run film drive in reverse direction step
130 determine rewind time period step
132 determine film movement step
134 reset rewind time period step
136 determine film drive run time greater than rewind time period step
138 stop motor step
139 start flash charger step
140 power control switch

The invention claimed is:

1. A camera for use with a power supply, the camera comprising:
   a voltage detecting circuit adapted to detect a voltage level at the power supply and to generate a voltage level signal;
   an image capture system for performing a set of power-consuming image capture operations; and
   a controller that prevents the image capture system from performing the set of image capture operations when the voltage level signal indicates there is power available in the power supply which is less than sufficient to perform all of the operations in the set of image capture operations, whereby the camera is rendered inactive before the power supply has practically run out of power.

2. The camera of claim 1, wherein the voltage level signal that indicates there is power available in the power supply which is less than sufficient to perform all of the operations in the set of image capture operations is a voltage level signal that indicates the power supply is not empty.

3. The camera of claim 2, wherein the set of image capture operations includes both picture taking operations, which are at least a shutter system operation and a scene illumination detection operation, and includes a film wind operation.

4. The camera of claim 3, wherein the set of image capture operations further includes a flash fire operation.

5. The camera of claim 2, wherein the set of image capture operations further includes a film rewind operation.

6. The camera of claim 1, wherein the voltage detecting circuit controls a power control switch connected to the power supply and the controller to disable the camera when the voltage level signal indicates there is power available in the power supply which is less than sufficient to perform all of the operations in the set of image capture operations.

7. A camera for use with a power supply, the camera comprising:
a voltage detecting circuit adapted to detect a voltage level at the power supply and to generate a voltage level signal;
an image capture system for performing a set of power-consuming image capture operations; and
a controller that prevents the image capture system from performing all of the operations in the set of image capture operations when the voltage level signal indicates there is power available in the power supply to perform only some of the operations in the set of image capture operations.

8. The camera of claim 7, wherein the image capture system comprises an image capture system that uses a solid state imager for capturing an image in the form of electronic signals.

9. A camera for use with a power supply, the camera comprising:
an image capture system for performing a set of power-consuming image capture operations;
a controller for commanding the image capture system to perform the set of image capture operations;
a shutter trigger input for generating a shutter trigger signal; and
a voltage detecting circuit for detecting a voltage level at the power supply that is sufficient for the image capture system to perform all of the operations in the set of image capture operations, which is activated by the shutter trigger signal, and which provides an enablement signal to the controller to instruct the controller to command the image capture system to perform the set of image capture operations when the power available in the power supply is sufficient for the image capture system to perform all of the operations in the set, but which does not provide the enablement signal to the controller when there is power available in the power supply that is sufficient to perform only some of the operations in the set.

10. The camera of claim 9, wherein the shutter trigger input generates the shutter trigger signal at a time when a user requests irrevocably that an image be captured on the image receiving medium.

11. A camera for use with a power supply, the camera comprising:
a voltage detecting circuit adapted to monitor voltage level at the power supply and to generate a voltage level signal;
an image capture system for performing a set of power-consuming image capture operations that capture an image on an image receiving medium; and
a controller that receives the voltage level signal at the time when a user requests irrevocably that an image be captured on the image receiving medium, using the image capturing system to perform the set of image-capture operations, but which prevents the image capture system from performing all of the operations in the set when the voltage level signal indicates there is power available in the power supply to perform only some of the operations in the set.

12. A method of operating an image capture system for performing a set of power-consuming image capture operations, the method comprising:
detecting a voltage level at the power supply and generating a voltage level signal; and
preventing the image capture system from performing all of the operations in the set of image capture operations when the voltage level signal indicates there is power available in the power supply to perform only some of the operations in the set of image capture operations.

13. A method of operating a camera for use with a power supply, the method comprising:
detecting a voltage level at the power supply and to generate a voltage level signal;
an image capture system for performing a set of power-consuming image capture operations; and
preventing an image capture system from performing a set of power-consuming image capture operations when the voltage level signal indicates there is power available in the power supply which is less than sufficient to perform all of the operations in the set of image capture operations, so that the camera is rendered inactive before the power supply has practically run out of power.

14. The method of claim 13, wherein the voltage level signal that indicates that there is power available in the power supply which is less than sufficient to perform all of the operations in the set of image capture operations is a voltage level signal that indicates the voltage level at the power supply is not empty.

15. A camera for use with a power supply, the camera comprising:
a voltage detecting circuit adapted to detect a voltage level at the power supply and to generate a voltage level signal, including one when the power supply has not practically run out of power;
an image capture system for performing a set of power-consuming image capture operations; and
a controller that prevents the image capture system from performing the set of image capture operations when the voltage level signal indicates there is power available in the power supply which is less than sufficient to perform all of the operations in the set of image capture operations, even though the power supply is sufficient to perform at least one of the operations in the set, whereby the camera is rendered inactive before the power supply has practically run out of power.

16. A method of operating a camera for use with a power supply, the method comprising:
detecting a voltage level at the power supply and generating a voltage level signal, including one when the power supply has not practically run out of power;
performing a set of power-consuming image capture operations; and
preventing the set of image capture operations from being performed when the voltage level signal indicates there is power available in the power supply which is less than sufficient to perform all of the operations in the set of image capture operations, even though the power supply is sufficient to perform at least one of the operations in the set, whereby the camera is rendered inactive before the power supply has practically run out of power.

* * * * *